Feb. 25, 1936.        B. M. SHORT        2,031,984
FENDERWELL SUPPORT FOR TIRES
Filed Oct. 4, 1934        2 Sheets-Sheet 1
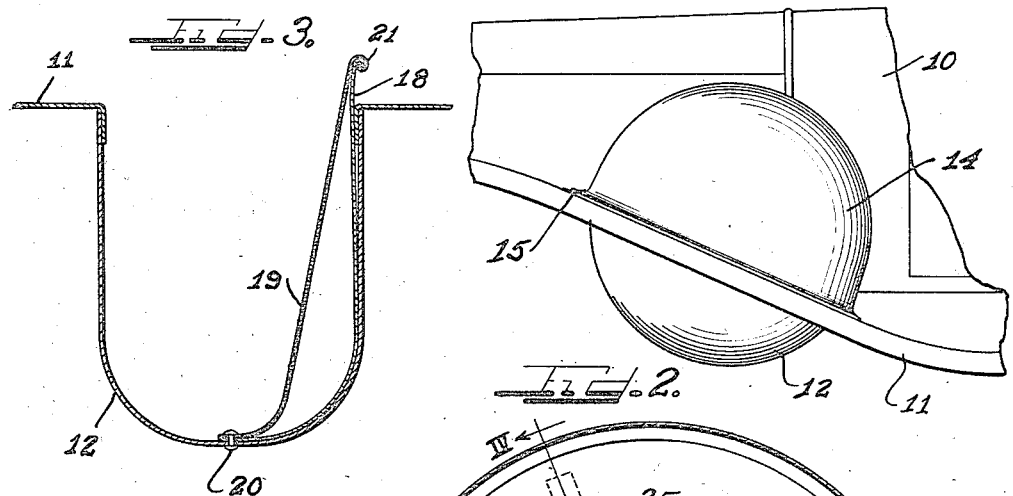
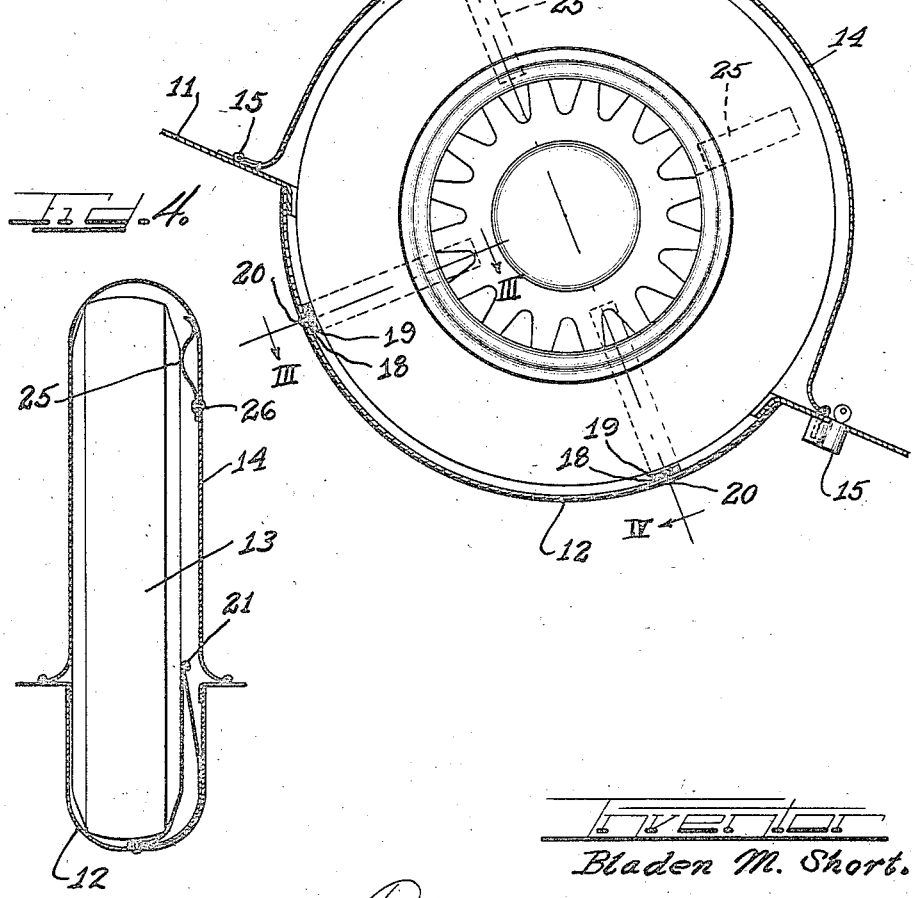
Inventor
Bladen M. Short.
by Charles H. Liell Attys.

Feb. 25, 1936.     B. M. SHORT     2,031,984
FENDERWELL SUPPORT FOR TIRES
Filed Oct. 4, 1934     2 Sheets-Sheet 2
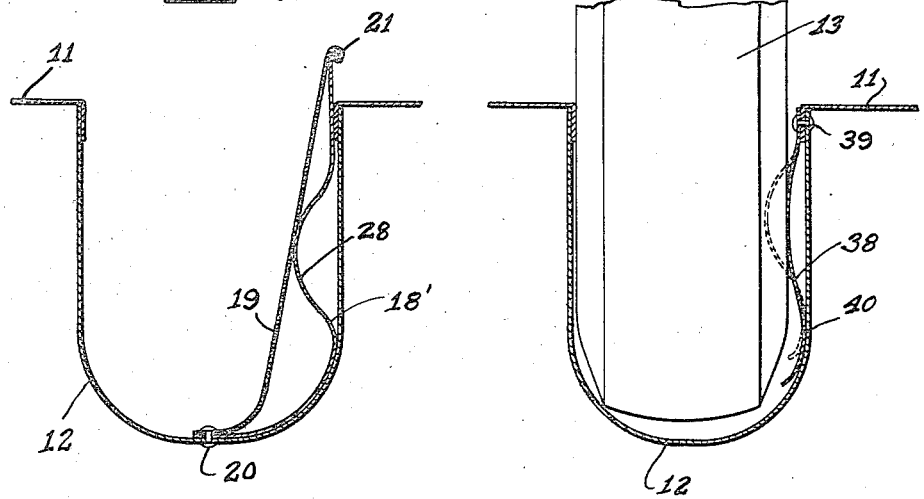
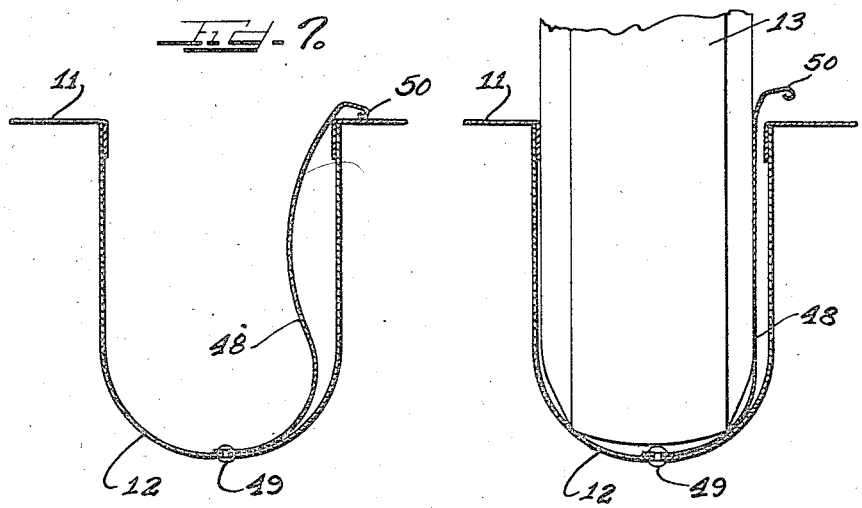
Inventor
Bladen M. Short.
by Charles H. Hiels Atty.

Patented Feb. 25, 1936

2,031,984

UNITED STATES PATENT OFFICE 2,031,984

FENDERWELL SUPPORT FOR TIRES

Bladen M. Short, Detroit, Mich., assignor to Lyon Cover Company, Detroit, Mich., a corporation of Michigan Application October 4, 1934, Serial No. 746,820

8 Claims. (Cl. 224—29)

The present invention relates to tire supports of the fenderwell type such as that shown in my U. S. Letters Patent No. 1,933,393, granted October 31, 1933, and more specifically to spring means for yieldably wedging a tire into a relatively tight position in a fenderwell.

An object of this invention is to provide a fenderwell support for a spare tire with means for causing the tire to fit snugly in the well irrespective of the condition of wear of the tire or whether the tire be inflated or deflated.

Another object of this invention is to provide a fenderwell support for a tire with means for preventing shifting of the tire in the support and to thus aid in minimizing disagreeable rattles and vibrations incident to the operation of the vehicle carrying the tire.

Still another object of this invention is to provide an automobile spare tire and wheel closure in which shifting of the tire in the closure is greatly minimized.

In accordance with the general features of this invention, there is provided a vehicle mounted closure for a spare tire and wheel including a well portion for receiving a lower portion of the tire and a hood portion cooperable with the well portion for enclosing the remaining portion of the tire; the closure thus formed including spring means for resisting shifting of the tire therein.

A number of different modifications of the invention are disclosed herein, all of which provide yieldable means in the fenderwell portion of the closure for exerting spring pressure on the lower portion of the tire in the well to cause the tire to be held relatively tight therein.

Other objects and features of this invention will more fully appear from the following detailed description taken in connection with the accompanying drawings, which illustrate several embodiments of the invention, and in which:

Figure 1 is a fragmentary side elevation of a vehicle mounted closure embodying the features of this invention.

Figure 2 is an enlarged vertical sectional view, taken through the structure shown in Figure 1, with a spare wheel therein.

Figure 3 is an enlarged sectional view taken on the line III—III of Figure 2, showing the construction of one form of the spring means for yieldably holding the tire in the well.

Figure 4 is a cross-sectional view taken on the line IV—IV of Figure 2, showing the spring means as deflected by a tire disposed in the closure, with the weight of the tire and wheel bearing on the spring means.

Figure 5 is a sectional view similar to Figure 3, showing a modification of the spring means.

Figure 6 is a sectional view similar to Figure 3, showing still another modification of the spring means and illustrating how the same is deflected by the tire in the well.

Figure 7 is a view similar to Figure 3 illustrating another form of spring means prior to the deflection of the same by a spare tire disposed in the well.

Figure 8 is a view similar to Figure 7 but showing the spring means deflected by a spare tire disposed in the well.

As shown on the drawings:

The reference character 10 designates generally a vehicle having a fender 11 provided with a fenderwell 12 adapted to receive the lower portion of a spare tire 13 as illustrated in Figure 4. The fenderwell 12 constitutes a part of a closure, the other part of which is a top receptacle 14 hingedly connected at 15 to the fender at the front end of the well 12. This hinged top 14 together with the fenderwell 12 forms a complete closure for the spare wheel and tire supported in the fenderwell.

It will also be noted that the hinged top or casing 14 may be provided at its side opposite its hinged end with any suitable locking means such as the locking means 15 for detachably locking it to the fender 11.

The fenderwell 12 is provided with a pair of resilient devices for wedging the tire tightly against the side wall of the fenderwell as best shown in Figures 2 and 3. Since these devices are identical, a description of one will suffice for both. Each of these devices includes a spring 18 and a strip of fabric 19, both of which are secured at one end by rivets 20 to the bottom of the well. The upper end of the strip of fabric 19 is curled around a curled end of the spring 18 as indicated at 21 so as to be secured thereto.

When a spare tire is inserted in the fenderwell the fabric strip 19 of each device is bent by the weight of the tire and wheel to the shape of the side of the tire, thus deflecting the spring 18 as shown in Figure 4. This results in the band and spring forcing the tire tightly against the fenderwell wall.

If it is so desired, the top part 14 of the closure may be provided with spaced springs 25 for forcing the upper end of the tire tightly against a side wall of the top part or hood 14, as best shown in Figure 4. Each of these springs has one end secured at 26 to a side wall of the cover 14 and has its intermediate part curved inwardly for yieldable engagement with the side of the tire. The other or free end of the spring is adapted to ride along the inner surface of the cover part 14, as will be evident from Figure 4.

In Figure 5 I have illustrated a slightly modified form of yieldable device for engaging the tire which, like the previously described one, includes a fabric band 19 and a yieldable spring 18' secured at 20 by rivets to the bottom of the fenderwell 12. The free ends of the band and spring are connected at 21 in the same way as they were connected in the first described form. The difference between this form of the invention and the first described form resides in the fact that the spring 18' has its intermediate portion bent inwardly at 28 so as to form a bulge in the spring. This bulged portion of the spring engages the back side of the fabric band 19 and is adapted to be indirectly engaged by the tire when the tire is inserted therein, thereby enabling the intermediate portion of the spring to bear against the side of the tire.

In Figure 6 I have illustrated another form of the invention in which the fenderwell 12 is provided with a curved spring 38 having its upper end secured by rivets 39 to a side wall of the fenderwell. The lower end 40 of the spring is free and is adapted to ride along the inner surface of the fenderwell 12. I have illustrated in dotted lines in Figure 6 the position of the curved spring 38 prior to its deflection by the tire. Upon the introduction of a tire in the fenderwell 12 the spring is deflected from the dotted line position to the full line position in which the intermediate curved portion of the spring is in engagement with the side wall of the tire and forces the tire tightly against a side of the fenderwell. This structure enables the spare tire 13 to be held in a relatively tight position in the fenderwell thereby minimizing any tendency of the spare tire to vibrate or rattle in the well.

In Figures 7 and 8 I have illustrated still a further form of the invention in which a spring 48 is secured at its lower end by rivets 49 to the bottom of the well 12. This spring is also of a curved section and has its free end bent outwardly and laterally and then turned upon itself as indicated at 50. This turned end of the spring 50 is adapted to extend over the apron part of the fender 11 as will be evident from Figures 7 and 8.

Prior to the insertion of a spare tire 13 in the well, the spring 48 assumes the position shown in Figure 7. After the tire has been inserted in the well, the spring is deflected by the tire to the position shown in Figure 8. The outwardly extending free portion of the spring 50 tends to prevent undue distortion of the spring when the tire is inserted in the fenderwell. It will of course be appreciated that in this form of the invention, as well as in the previously described form of the invention shown in Figure 6, the spring is deflected by the tire so as to conform to the tire contour when the tire is mounted in the well and at the same time exerts a sidewise pressure on the tire to force the tire against the side of the fenderwell whereby the tire is held against shifting in the well.

In all forms of the invention it is the weight of the spare wheel and tire which deflects the spring means as the spare tire and wheel comes to rest in the bottom of the well tightly wedged between the spring means and a side wall of the fenderwell. Thus there is provided in the use of the spring means, a yieldable play take-up device which insures a tight fit of the tire in the well, irrespective of slight variations in the size or contour of the tire, and irrespective of whether the tire is inflated or deflated.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The combination with an automobile fenderwell having a spare tire therein, of a resilient cradle in the well and so arranged as to yieldably engage only one side of the spare tire in the well, said cradle being yieldably disposed in the well to establish a cushion between the tire and the bottom of the well, and including a yieldable support responsive to the weight of a tire inserted in the cradle to cause the cradle to engage a side of the tire and force the tire laterally against and into tight engagement with a side wall of the fenderwell.

2. The combination with an automobile fenderwell having a spare tire therein, of spring means in the fenderwell at substantially only one side of the well and deflectable upon the introduction of a tire in the well for forcing the tire laterally against the other side of the well to aid in holding the tire against shifting in the well.

3. The combination with an automobile fenderwell having a spare tire therein, of spring means in the fenderwell deflectable upon the introduction of a tire in the well for forcing the tire laterally against a side of the well to aid in holding the tire against shifting in the well, said spring means including a fabric band for engagement with a portion of the side wall of the tire remote from said side of the well and a spring having spaced portions connected to said band and secured to said well for resisting distortion of the band upon its engagement by the tire and so as to exert a yieldable pressure on the tire.

4. The combination with an automobile fenderwell having a spare tire therein, of spring means in the fenderwell deflectable upon the introduction of a tire in the well for forcing the tire laterally against a side of the well to aid in holding the tire against shifting in the well, said spring means including a fabric band arranged to be engaged by only one side of the tire and a spring having its ends secured to the ends of the band with its intermediate portions spaced apart whereby distortion of said fabric band upon its engagement by the tire is resisted by the resiliency of the spring.

5. The combination with an automobile fenderwell having a spare tire therein, of spring means in the fenderwell deflectable upon the introduction of a tire in the well for forcing the tire laterally against a side of the well to aid in holding the tire against shifting in the well, said spring means including a strip of resilient metal having one of its ends secured to the well and having its other end arranged for free movement whereby upon the introduction of the tire in the well the spring is free to be deflected by the tire and to conform with the side contour of the portion of the tire adjacent the spring.

6. The combination with an automobile fenderwell having a spare tire therein, of spring means in the fenderwell deflectable upon the introduction of a tire in the well for forcing the tire laterally against a side of the well to aid in holding the tire against shifting in the well, said spring means including a strip of resilient metal having one of its ends secured to the well and having its other end arranged for free movement whereby upon the introduction of the tire in the well the spring is free to be deflected by the tire and to conform with the side contour of the portion of the tire adjacent the spring, said spring having its intermediate portion curved so as to project in the path of the tire inserted in the well and to be deflected thereby.

7. A spare tire cover member having therein spring means projecting into the interior of the member and arranged to be engaged by the tire when the same is positioned in the member, said spring means including a portion so arranged as to be deflectable by the tire by gravity in a direction transverse to the plane of the tire whereby the tire is forced in a direction away from the spring means into tight engagement with a side wall of the member.

8. A spare tire cover member having therein spring means projecting into the interior of the member and arranged to be engaged by the tire when the same is positioned in the member, said spring means including a portion so arranged as to be deflectable by the tire by gravity in a direction transverse to the plane of the tire whereby the tire is forced in a direction away from the spring means into tight engagement with a side wall of the member, said portion being bowed outwardly and having a freely slideable end.

BLADEN M. SHORT.